United States Patent
Roberts

(10) Patent No.: US 9,685,990 B2
(45) Date of Patent: *Jun. 20, 2017

(54) METHODS AND DEVICES FOR OVERCOMING INSERTION LOSS IN RF SYSTEMS

(71) Applicant: Peregrine Semiconductor Corporation, San Diego, CA (US)

(72) Inventor: Kevin Roberts, Rohnert Park, CA (US)

(73) Assignee: Peregrine Semiconductor Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/154,819

(22) Filed: May 13, 2016

(65) Prior Publication Data

US 2016/0277060 A1    Sep. 22, 2016

Related U.S. Application Data

(63) Continuation of application No. 14/660,819, filed on Mar. 17, 2015, now Pat. No. 9,374,125.

(51) Int. Cl.
| | | |
|---|---|---|
| *H04B 1/38* | (2015.01) | |
| *H04B 1/44* | (2006.01) | |
| *H04W 72/04* | (2009.01) | |
| *H04B 1/00* | (2006.01) | |
| *H04B 1/18* | (2006.01) | |

(52) U.S. Cl.
CPC .............. *H04B 1/44* (2013.01); *H04B 1/006* (2013.01); *H04B 1/18* (2013.01); *H04W 72/0453* (2013.01)

(58) Field of Classification Search
CPC ... H04B 1/44; H04B 1/38; H04B 1/48; H04B 1/40; H04B 1/71055
USPC .................. 375/219; 455/75; 710/1
See application file for complete search history.

(56) References Cited

U.S. PATENT DOCUMENTS

| | | | |
|---|---|---|---|
| 6,804,502 B2 | 10/2004 | Burgener et al. | |
| 7,248,120 B2 | 7/2007 | Burgener et al. | |
| 7,910,993 B2 | 3/2011 | Brindle et al. | |
| 8,929,945 B1* | 1/2015 | Wei ...................... | H04B 1/0057 330/165 |
| 9,197,194 B2 | 11/2015 | Reedy et al. | |
| 9,374,125 B1 | 6/2016 | Roberts | |
| 2003/0090313 A1 | 5/2003 | Burgener et al. | |
| 2012/0071109 A1 | 3/2012 | Akesson | |
| 2012/0139641 A1* | 6/2012 | Kaczman ............... | H03F 1/0222 330/295 |
| 2013/0222075 A1 | 8/2013 | Reedy et al. | |

(Continued)

FOREIGN PATENT DOCUMENTS

WO     2009-108391     9/2009

OTHER PUBLICATIONS

Tayong, Helene E., Office Action received from the USPTO dated Nov. 6, 2015 for U.S. Appl. No. 14/660,819, 17 pgs.

(Continued)

*Primary Examiner* — Helene Tayong
(74) *Attorney, Agent, or Firm* — Jaquez Land Greenhaus LLP; Martin J. Jaquez, Esq.; Alessandro Steinfl, Esq.

(57) ABSTRACT

Methods and devices are described for overcoming insertion loss notches in RF systems. In one case programmable impedances are used to move an insertion loss notch outside a frequency band of interest.

21 Claims, 12 Drawing Sheets

(56) References Cited

U.S. PATENT DOCUMENTS

2014/0213201 A1* 7/2014 Reisner .................. H04B 1/04
                                                                          455/113
2014/0266455 A1   9/2014 Kaatz et al.
2014/0302797 A1  10/2014 Han et al.
2015/0048898 A1   2/2015 Gaynor

OTHER PUBLICATIONS

Tayong, Helene E., Notice of Allowance received from the USPTO dated Feb. 12, 2016 for U.S. Appl. No. 14/660,819, 12 pgs.

Roberts, Kevin, Comments on Examiner's Statement of Reasons for Allowance filed in the USPTO dated May 12, 2016 for U.S. Appl. No. 14/660,819, 5 pgs.

Roberts, Kevin, Amendment filed in the USPTO dated Dec. 30, 2015 for U.S. Appl. No. 14/660,819, 17 pgs.

Roberts, Kevin, Amendment After Allowance filed in the USPTO dated Apr. 1, 2016 for U.S. Appl. No. 14/660,819, 11 pgs.

\* cited by examiner

METHODS AND DEVICES FOR OVERCOMING INSERTION LOSS IN RF SYSTEMS

CROSS REFERENCE TO RELATED APPLICATIONS—CLAIM OF PRIORITY

This application is a continuation of co-pending U.S. application Ser. No. 14/660,819 filed Mar. 17, 2015, entitled "Methods and Devices for Overcoming Insertion Loss in RF Systems", the disclosure of which is incorporated herein by reference in its entirety. U.S. application Ser. No. 14/660,819 may be related to U.S. Pat. No. 6,804,502, issued on Oct. 12, 2004 and entitled "Switch Circuit and Method of Switching Radio Frequency Signals", the disclosure of which is incorporated herein by reference in its entirety. U.S. application Ser. No. 14/660,819 may also be related to U.S. Pat. No. 7,910,993, issued on Mar. 22, 2011 and entitled "Method and Apparatus for use in Improving Linearity of MOSFET's using an Accumulated Charge Sink", the disclosure of which is incorporated herein by reference in its entirety. U.S. application Ser. No. 14/660,819 may also be related to International Publication No. WO2009/108391 published on Sep. 3, 2009, entitled "Method and Apparatus for use in digitally tuning a capacitor in an integrated circuit device", the disclosure of which is incorporated herein by reference in its entirety. U.S. application Ser. No. 14/660,819 may also be related to U.S. Published Application No. 2013/0222075A1 filed on Aug. 27, 2012, entitled "Method and Apparatus for Use in Tuning Reactance in a Circuit Device", the disclosure of which is incorporated herein by reference in its entirety. U.S. application Ser. No. 14/660,819 may also be related to U.S. Pat. No. 7,248,120, issued on Jul. 24, 2007, entitled "Stacked Transistor Method and Apparatus", the disclosure of which is incorporated herein by reference in its entirety. U.S. application Ser. No. 14/660,819 may also be related to U.S. Published Application No. 2015/0048898 A1 published on Feb. 19, 2015, entitled "Tunable Impedance Matching Network", the disclosure of which is incorporated herein by reference in its entirety. U.S. application Ser. No. 14/660,819 may also be related to U.S. Published Application No. 2014/0266455A1 filed on Mar. 12, 2013, entitled "Variable Impedance Match and Variable Harmonic Terminations for Different Modes and Frequency Bands", the disclosure of which is incorporated herein by reference in its entirety.

BACKGROUND

1. Field

The present teachings relate to RF (radio frequency) circuits. More particularly, the present teachings relate to methods and devices for overcoming insertion loss in an RF transmit and/or receive system.

2. Description of Related Art

Radio frequency (RF) devices, such as cell phone transmitters, are becoming increasingly complex due to additional frequency bands, more complex modulation schemes, higher modulation bandwidths, and the introduction of data throughput improvement schemes such as simultaneous RF transmission and/or reception within a same or different, but closely spaced, bands or channels within a band (e.g. voice, data), and aggregate transmission wherein information is multiplexed over parallel RF transmissions. Due to the higher complexity of transmit/receive paths (transmit and/or receive paths) of a front-end stage used in such RF devices, which can include devices with various impedance characteristics, such as duplexers, diplexers, switches, etc., and the coupling of such transmit/receive paths to one or more common antennae, impedance of an inactive transmit/receive path can couple to the impedance of an active transmit/receive path and thus create an associated resonance in the active transmit/receive path. In some cases, such resonance can take place at a frequency within a frequency band of the active transmit/receive path and therefore can adversely influence performance of the active transmit/receive path, such as, for example, a deterioration of a corresponding insertion loss.

SUMMARY

According to a first aspect of the present disclosure, a radio frequency (RF) circuital arrangement is presented, comprising: a first transmit and/or receive path comprising a first configurable impedance network and one or more RF devices; a second transmit and/or receive path comprising a second configurable impedance network and one or more RF devices; an antenna to transmit and/or receive an RF signal; and an antenna switch configured to selectively couple the first transmit and/or receive path to the antenna for transmitting/receiving of the RF signal, thereby activating the first transmit and/or receive path, and decouple the second transmit and/or receive path from the antenna, thereby deactivating the second transmit and/or receive path, wherein a configurable impedance network of the inactive second transmit and/or receive path is configured to reduce an impedance coupling effect of the inactive second transmit and/or receive path over the active first transmit and/or receive path.

According to second aspect of the present disclosure, a method for reducing insertion loss in an RF circuital arrangement is presented, the method comprising: providing a plurality of RF transmit and/or receive paths selectively coupled to one or more RF antennas via one or more antenna switches; coupling, via the one or more antenna switches, one or more RF transmit and/or receive paths of the plurality of RF transmit and/or receive paths to a subset of the one or more antennas, thereby activating the one or more RF transmit and/or receive paths; based on the coupling, decoupling via the one or more antenna switches, a remaining one or more RF transmit and/or receive paths of the plurality of RF transmit and/or receive paths, thereby deactivating the remaining one or more RF transmit and/or receive paths; based on the coupling, transmit and/or receive an RF signal over the active one or more RF transmit and/or receive paths; whereby based on the deactivating and the transmit and/or receive of the RF signal, a resonance effect is obtained in the active one or more RF transmit and/or receive paths at a resonance frequency within a frequency band of operation of the RF signal; providing one or more configurable impedance networks to the inactive one or more RF transmit and/or receive paths; configuring the one or more configurable impedance networks; and based on the configuring, shifting the resonance frequency outside the frequency band of operation thus reducing an insertion loss of the RF signal.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

Figure 1:
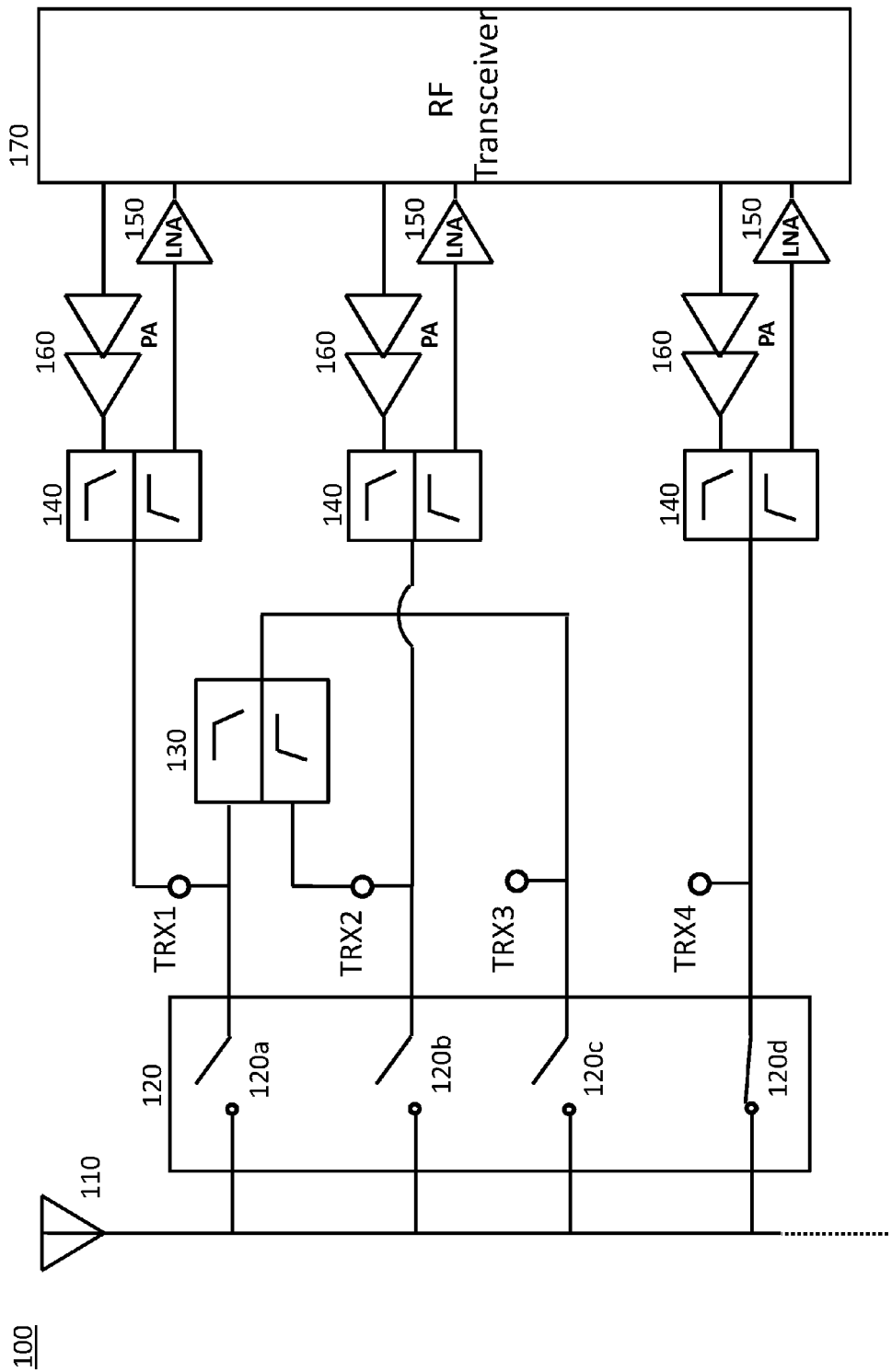
FIG. 1 shows a block diagram of a multi-band and multi-channel RF front-end stage (RF stage) of an RF device, as used, for example, in a cellular phone. The RF stage comprises transmit and receive paths for high frequency bands and low frequency bands which are coupled, via a switch unit, to a common transmit/receive antenna.

Throughout this description, embodiments and variations are described for the purpose of illustrating uses and implementations of the inventive concept. The illustrative description should be understood as presenting examples of the inventive concept, rather than as limiting the scope of the concept as disclosed herein.

As used in the present disclosure, the terms "switch ON" and "active" may be used interchangeably and can refer to the providing of a low impedance conduction path to an RF signal by an RF circuit or an RF circuit element. For example, an RF path, comprising a plurality of RF circuit elements, that is active, can provide a low impedance conduction path to an RF signal for effective transmission and/or reception of the signal through the plurality of elements of the RF path. Typically, an active RF path minimizes the insertion loss subjected to the RF signal. As used in the present disclosure, the terms "switch OFF" and "inactive" may be used interchangeably and can refer to providing a high impedance conduction path to an RF signal by an RF circuit or an RF circuit element. For example, an RF path, comprising a plurality of RF circuit elements, that is inactive, can provide a high impedance conduction path to an RF signal and can therefore effectively prevent transmission and/or reception of the RF signal through one or more of the plurality of elements of the RF path. Typically, an inactive RF path maximizes the insertion loss subjected to the RF signal. It should be noted that even when switched OFF or inactive, an RF circuit remains electrically operational, as a corresponding impedance can influence impedance of a coupled circuit The present disclosure describes electrical circuits in electronics devices (e.g., cell phones, radios) having a plurality of devices, such as for example, transistors (e.g., MOSFETs). Persons skilled in the art will appreciate that such electrical circuits comprising transistors can be arranged as amplifiers.

The term "amplifier" as used in the present disclosure is intended to refer to amplifiers comprising single or stacked transistors configured as amplifiers, and can be used interchangeably with the term "power amplifier (PA)". Such terms can refer to a device that is configured to amplify a signal input to the device to produce an output signal of greater magnitude than the magnitude of the input signal. Stacked transistor amplifiers are described for example in U.S. Pat. No. 7,248,120, issued on Jul. 24, 2007, entitled "Stacked Transistor Method and Apparatus", the disclosure of which is incorporated herein by reference in its entirety. Such amplifier and power amplifiers can be applicable to amplifiers and power amplifiers of any stages (e.g., pre-driver, driver, final), known to those skilled in the art.

As used in the present disclosure, the term "mode" can refer to a wireless standard and its attendant modulation and coding scheme or schemes. As different modes may require different modulation schemes, these may affect required channel bandwidth as well as affect the peak-to-average-ratio (PAR), also referred to as peak-to-average-power-ratio (PAPR), as well as other parameters known to the skilled person. Examples of wireless standards include Global System for Mobile Communications (GSM), code division multiple access (CDMA), Worldwide Interoperability for Microwave Access (WiMAX), Long Term Evolution (LTE), as well as other wireless standards identifiable to a person skilled in the art. Examples of modulation and coding schemes include binary phase-shift keying (BPSK), quadrature phase-shift keying (QPSK), quadrature amplitude modulation (QAM), 8-QAM, 64-QAM, as well as other modulation and coding schemes identifiable to a person skilled in the art.

As used in the present disclosure, the term "band" can refer to a frequency range. More in particular, the term "band" as used herein refers to a frequency range that can be defined by a wireless standard such as, but not limited to, wideband code division multiple access (WCDMA) and long term evolution (LTE).

As used in the present disclosure, the term "channel" can refer to a frequency range. More in particular, the term "channel" as used herein refers to a frequency range within a band. As such, a band can comprise several channels used to transmit/receive a same wireless standard.

FIG. 1 shows a block diagram of a multi-band and multi-channel RF front-end stage (100) of an RF device, such as, for example, a cellular phone. The RF front-end stage (100) comprises several transmit path and a receive paths which can be used to process high band and low band RF signals. In particular, four RF paths are provided in the RF front-end stage (100), each being identified by a corresponding node TRX1, TRX2, TRX3 and TRX4, and each providing a conductance, to an RF signal being transmitted and/or received, between the antenna (110) and the transceiver unit (170).

Nodes TRX1, TRX2, TRX3 and TRX4 are coupled, via a switch unit (120), to the common antenna (110). As seen in FIG. 1, the switch unit (120) can include a plurality of internal switches (120a-120d) which can selectively be configured to connect one or more of the nodes TRX1, TRX2, TRX3 and TRX4 to the antenna while disconnecting the remaining nodes.

In the exemplary configuration depicted in FIG. 1, the switch unit (120) connects node TRX4 to the antenna by closing internal switch (120d) and disconnects nodes TRX1, TRX2 and TRX3 from the antenna by opening internal switches (120a, 120b, 120c). Such configuration can therefore allow RF signal transmission and reception via the transmit/receive path identified by TRX4, which can include a duplexer unit (140) for both transmitting and receiving of the RF signal, a power amplifier unit (160) for transmitting of the RF signal, and a low noise amplifier (LNA) unit (150) for receiving of the RF signal. Similarly, paths identified by nodes TRX1 and TRX2 can also include a duplexer unit (140), a power amplifier (160) and an LNA unit (150), which can allow transmission and reception of an RF signal through such paths via antenna (110) and switch unit (120). The person skilled in the art will understand that the exemplary front-end stage (100) of FIG. 1 is depicted in a simplified form as various related signal connections are not shown, including control lines to the switch unit (120).

The exemplary RF front-end stage (100) of FIG. 1 can include a diplexer unit (130) which can be used for operation of the RF front-end stage (100) in a carrier aggregation mode. For example, an aggregate RF signal, containing a low frequency component and a high frequency component, can be received at node TRX3 and fed to the diplexer unit (130), which in turn can separate the high frequency component and the low frequency component of the aggregate RF signal and respectively feed, via nodes TRX2 and TRX1, to the LNA (150) for further processing by the transceiver unit (170). In such mode of operation, the internal switches (120a, 120b, 120d) are open to allow decoupling of nodes TRX1, TRX2 and TRX4 from the antenna (110), and internal switch (120c) is closed to allow coupling of node TRX3 to the antenna (110) (internal switch configuration not shown in FIG. 1).

Figure 9:
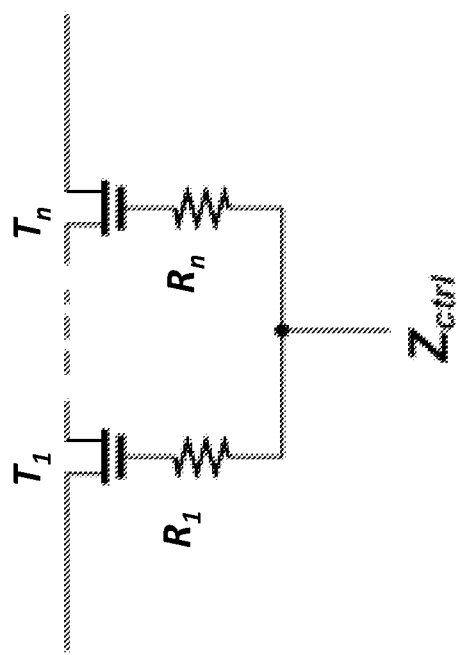
FIG. 9 shows an exemplary stacked RF switch using one or more FET transistors.

Any switch or switching circuitry of the present disclosure, such as switches (120a, 120b, 120c, 120d) shown in the various figures of the present disclosure can be implemented using transistors, stacked transistors (FETs), diodes, or any other devices or techniques known to or which can be envisioned by a person skilled in the art. In particular, such switching circuitry can be constructed using CMOS technology and various architectures known to the skilled person, such as, for example, architecture presented in U.S. Pat. No. 7,910,993, issued on Mar. 22, 2011 and entitled "Method and Apparatus for use in Improving Linearity of MOSFET's using an Accumulated Charge Sink", and in U.S. Pat. No. 6,804,502, issued on Oct. 12, 2004 and entitled "Switch Circuit and Method of Switching Radio Frequency Signals", both incorporated herein by reference in their entirety. FIG. 9 of the present application shows an exemplary embodiment of a single-pole single-throw switch with stacked transistors, which the skilled person can use as an elementary component of the various switches used in the various embodiments according to the present disclosure.

Although FETs (e.g. MOSFETs) can be used to describe transistor and stacked transistor switches used in the various embodiments of the present disclosure, a person skilled in the art would recognize that either P-type or N-type MOSFETs may be used. The skilled person would also recognize that other types of transistors such as, for example, bipolar junction transistors (BJTs) can be used instead or in combination with the N-type or P-type MOSFETs. Furthermore, a person skilled in the art will also appreciate the advantage of stacking more than two transistors, such as three, four, five or more, provide on the voltage handling performance of the switch. According to some embodiments of the present disclosure, number of stacked transistors of the switch can depend on a voltage expected across the switch. Stacking of transistors can, for example, be achieved when using non bulk-silicon technology, such as insulated silicon on sapphire (SOS) technology and silicon on insulator (SOI) technology. In general, the various switches used in the various embodiments of the present disclosure, including when monolithically integrated in an RF transmit/receive path which can include various RF components (e.g. configurable impedance networks, as discussed later), can be constructed using CMOS, silicon germanium (SiGe), gallium arsenide (GaAs), gallium nitride (GaN), bipolar transistors, or any other viable semiconductor technology and architecture known, including micro-electro-mechanical (MEM) modules. Additionally, different device sizes and types can be used for a transistor device within a stacked transistor switch such as to accommodate various current handling capabilities of the switch.

Figure 2:
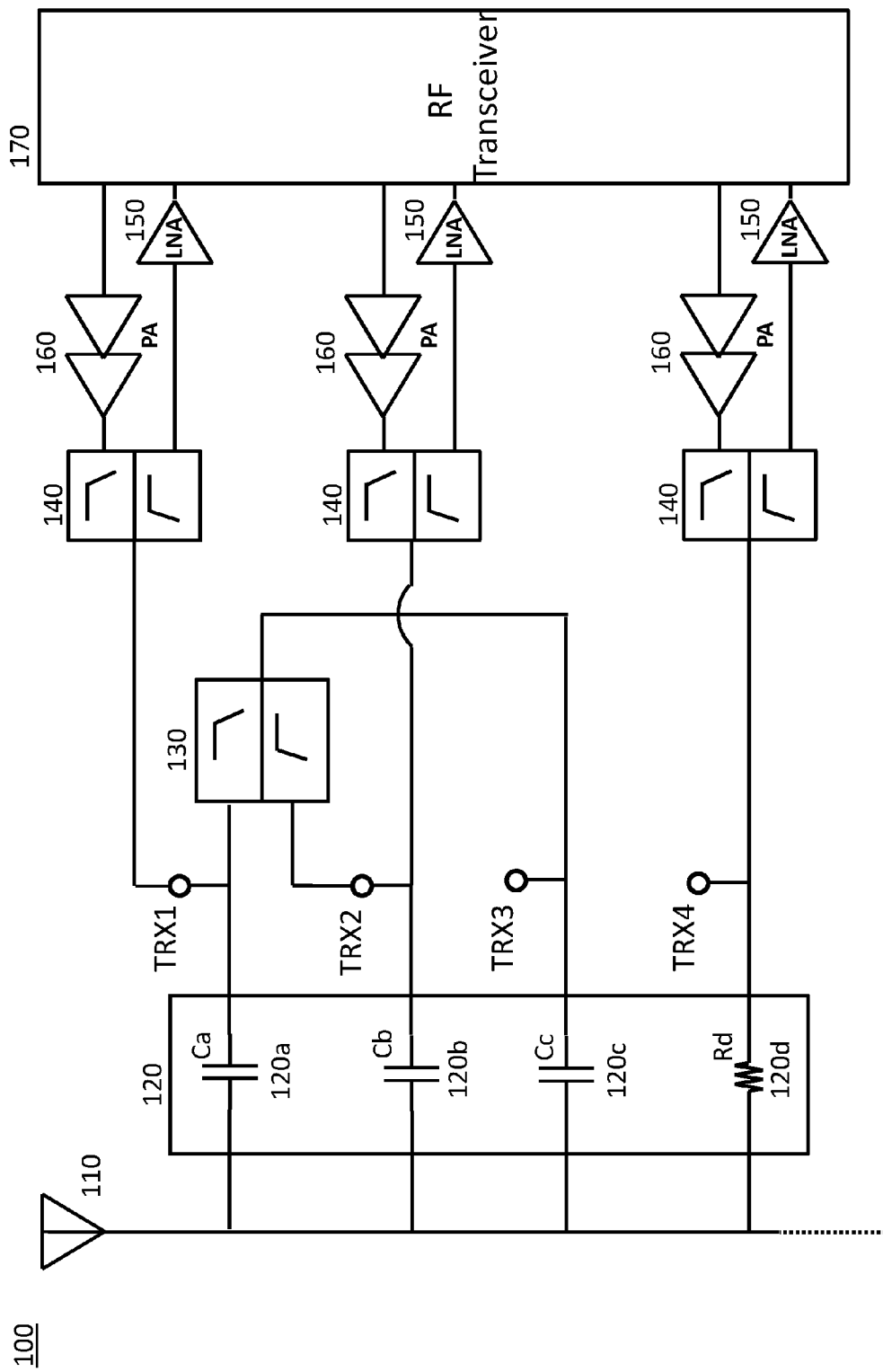
FIG. 2 shows an equivalent block diagram of the RF stage depicted in FIG. 1, where an equivalent internal configuration of the switch unit is shown.

FIG. 2 shows the configuration depicted in FIG. 1 with further details of the switch unit (120). As known to the person skilled in the art, RF switches can be made with transistor devices which can be turned ON, to allow for an RF conduction path, or turned OFF, to prevent an RF conduction path. Equivalent circuits for an ON condition (e.g. resistor) and an OFF condition (e.g. capacitor) of the internal switches (120a, 120b, 120c, 120d) are represented in FIG. 2.

As can be seen in FIG. 2, while node TRX4 is active (e.g. the corresponding RF transmit/receive path is active), it is coupled via a low resistance resistor Rd of the internal switch (120d) to the antenna (110). At the same time, nodes TRX1, TRX2 and TRX3 are respectively coupled via equivalent capacitors (Ca, Cb, Cc) of the internal switches ((120a, 120b, 120c) to the antenna (110), and therefore, such nodes are also coupled to node TRX4. The inventor has established that such coupling of the inactive paths (associated to nodes TRX1, TRX2 and TRX3) to the active path (associated to node TRX4) can influence an impedance seen at node TRX4 and therefore can influence an associated RF signal. Such coupling can therefore allow the various impedances associated to the inactive paths (TRX1, TRX2, TRX3) to feed through the switch unit (120) and cause undesired resonance in the active path associated to the active node TRX4. In some cases the undesired resonance can occur in a frequency which is within a frequency band of operation of the active path and therefore deteriorate a performance of the active path with respect to the RF signal, such as an associated insertion loss, as shown in FIG. 3.

Figure 3:
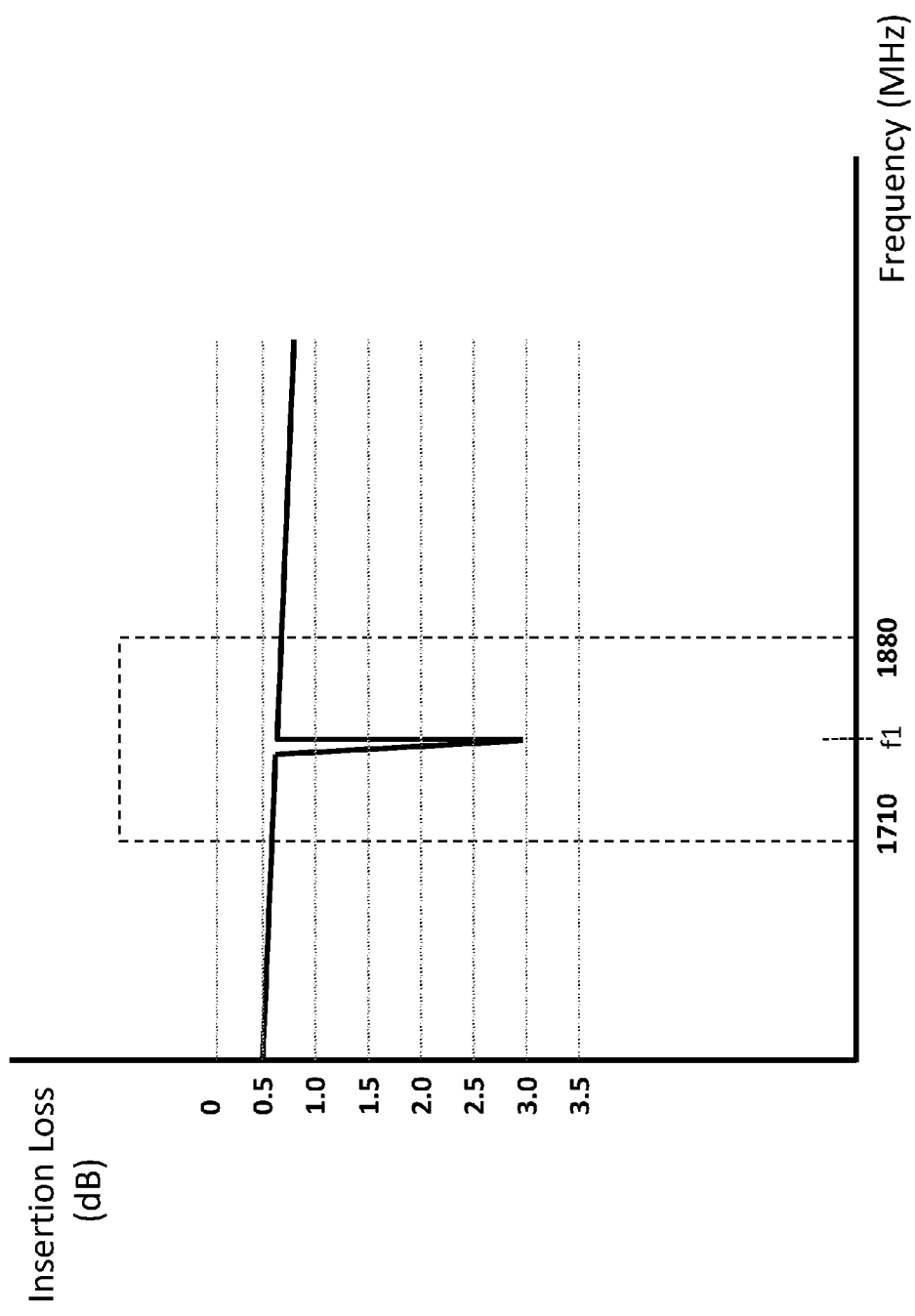
FIG. 3 shows a plot representing a notch in insertion loss at a frequency within a frequency band of operation of an active transmit/receive path of the RF stage depicted in FIG. 1.

FIG. 3 shows a plot of an exemplary insertion loss in the active path associated with node TRX4 (e.g. at node TRX4), while transmit/receive paths associated to nodes TRX1, TRX2 and TRX3 are inactive. The exemplary insertion loss plot depicted in FIG. 3 includes a notch, larger than 2 dB in magnitude, at a frequency (f1) within a frequency band of operation (e.g. 1710-1880 MHz, approximately 0.2 GHz wide) of the active path. As mentioned in the above section of the present disclosure, such a notch can be the result of coupling of impedances associated to the inactive paths to the antenna (and therefore to node TRX4), via switch unit (120). Such coupled impedances can be from any circuit present in the inactive paths, such as, for example, the diplexer unit (130). The person skilled in the art will know that (inactive) RF transmit/receive paths can include circuit elements other than one represented in FIGS. 1-2, where such circuit elements can exhibit different impedances at a given frequency band of operation, which can equally affect the insertion loss of an active path via a similar resonance affect as described above. Coupling of different impedances associated to different circuit elements in the inactive paths can result in resonance at different frequencies which may include a frequency within a band of operation of the active path. It should be noted that although the discussion above was made with respect to an active path associated to node TRX4, same discussion can be made for any other one or more active paths and corresponding inactive paths of FIGS. 1-2.

Figure 4:
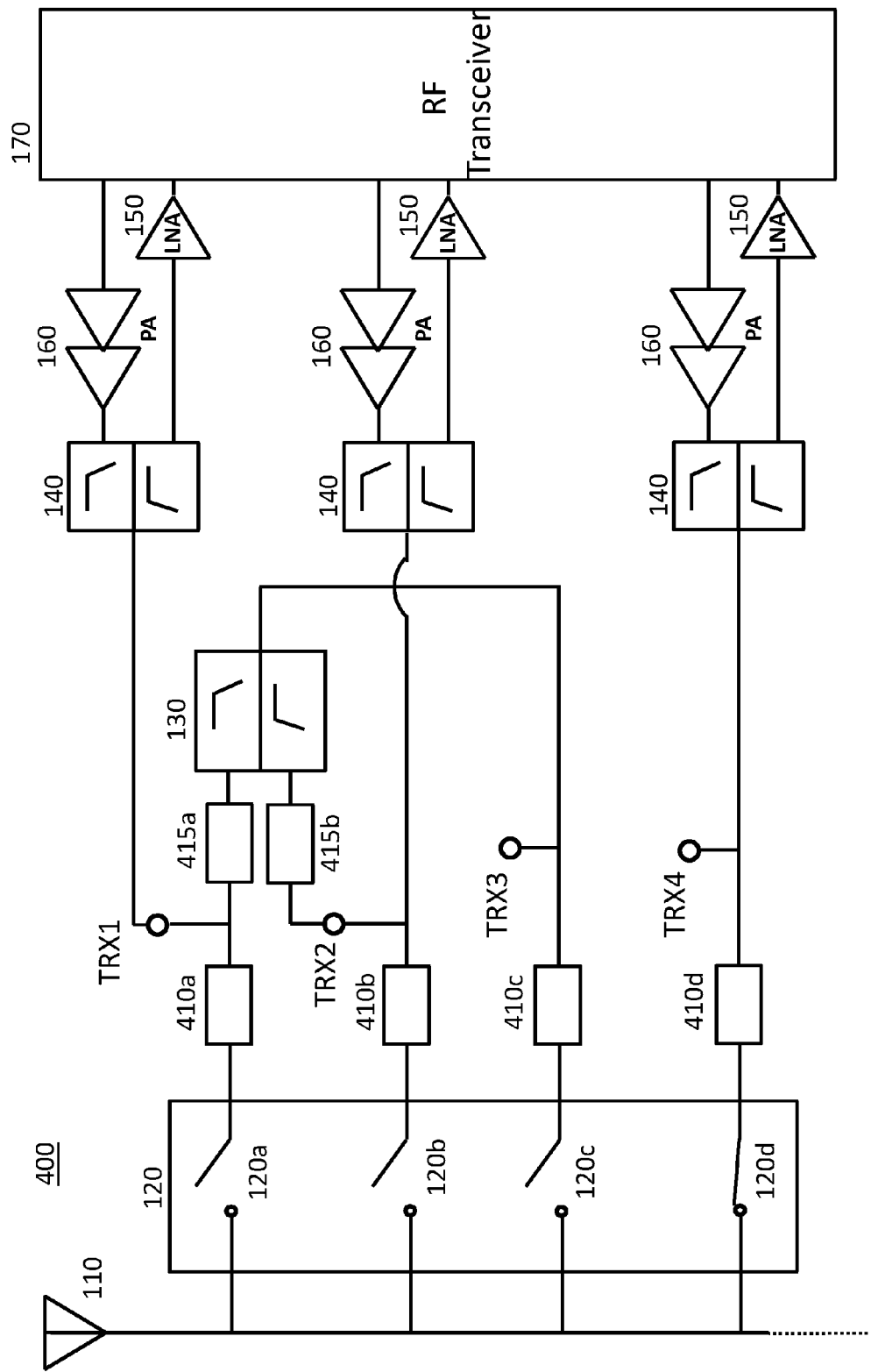
FIG. 4 shows an exemplary embodiment according to the present disclosure where configurable impedance networks are added to the transmit and receive paths of the RF stage depicted in FIG. 1 such as to overcome the dip in insertion loss depicted in FIG. 3.

FIG. 4 shows an exemplary embodiment according to the present disclosure of a front-end stage (400), based on the front-end stage (100) of FIG. 1, where configurable impedance networks (410a, 415a), (410b, 415b), (410c), (410d) are respectively used to modify the impedances of the paths associated with nodes TRX1, TRX2, TRX3 and TRX4. Specifically, these impedance networks (410a, 410b, 410c, 410d, 415a, 415b) are designed to minimally affect a corresponding transmit/receive path in the active mode, while in the inactive mode, providing means to alter a resonance frequency of an active path. For example, impedance networks (410a, 415a) coupled at node TRX1, can be configured to minimally affect the performance of the transmit/receive path associated to node TRX1 (e.g. 110, 120a, 410a, 415a, 130, 150) while the path associated to node TRX1 is active, and, while the path associated to node TRX1 is inactive, the impedance networks (410a, 415a) can be configured to provide the means to shift a resonance frequency created in an active transmit/receive path of the front-end system (400), such as an active path associated to node TRX4. Each transmit/receive path of the front-end stage (400) depicted in FIG. 4 can therefore, while inactive, provide a means to affect the performance of an active path of the front-end stage (400) via an associated configurable impedance network. For example, in the configuration depicted in FIG. 4, where transmit/receive path associated with node TRX4 is active and transmit/receive paths associated with nodes TRX1, TRX2 and TRX3 are inactive, impedance networks (410a, 415a, 410b, 415b, 410c) of the inactive paths, in combination, can be configured such as to affect the performance of the active path associated with node TRX4.

Figure 5:
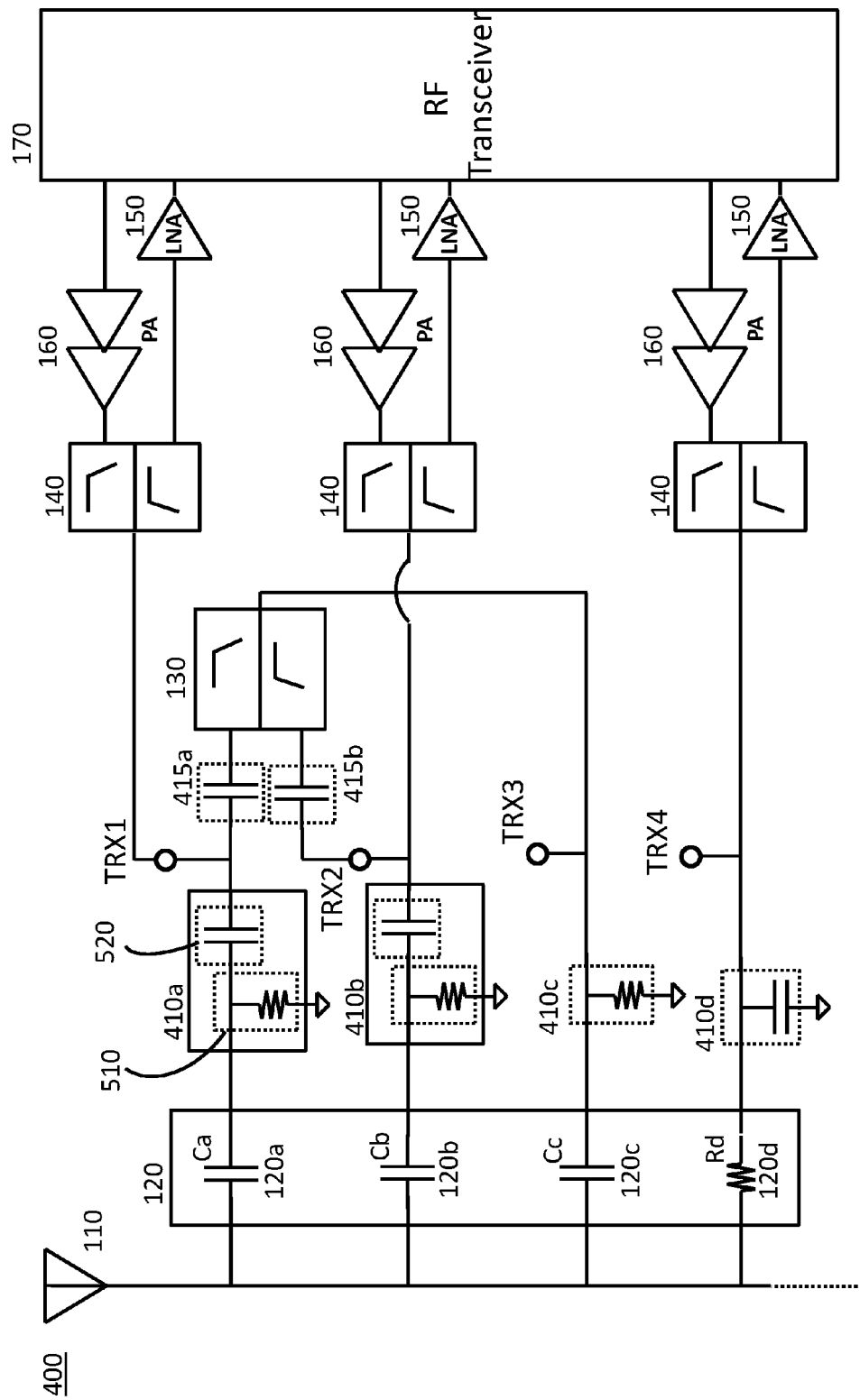
FIG. 5 shows an equivalent block diagram of the RF stage depicted in FIG. 4, where equivalent internal configurations of a switch unit and the configurable impedance networks are shown.

FIG. 5 shows an exemplary embodiment according to the present disclosure of the configurable impedance networks (410a, 410b, 410c, 410d, 415a, 415b) depicted in FIG. 4. As shown in FIG. 5, the exemplary configurable impedance networks (410a, 410b) can each include two configurable impedances (510, 520), and configurable impedance networks (410c, 410d, 415a, 415b) can be a single configurable impedance (410c), (410d), (415a) and (415b). According to an embodiment of the present disclosure, such configurable impedances (510, 520, 410c, 410d, 415a, 415b) can be reactive impedances (e.g. capacitor, inductor) in a first state, and resistive impedances in a second state. Configuration of the configurable impedances between the first and the second state can be provided via dedicated control lines (not shown in the figure).

As shown in the exemplary embodiment depicted in FIG. 5, the configurable impedance networks (410a, 410b, 410c, 410d, 415a, 415b) can provide a different termination to each transmit/receive path depending on the path being active or inactive. For example, in the configuration depicted in FIG. 5, termination at node TRX4 of the active transmit/receive path is provided by capacitively terminating node TRX4 to system ground via configurable impedance (410d), while terminations at nodes TRX1, TRX2 and TRX3 of the inactive paths are provided by resistively terminating the nodes to system ground via configurable impedances (410a, 410b, 410c). In the case where transmit/receive paths associated with nodes TRX1 and TRX2 are active (e.g. operation in carrier aggregation mode), node TRX4 can be terminated resistively to system ground by configuring impedance network (410d) to be resistive, and nodes TRX1 and TRX2 can be terminated capacitively by configuring impedance (510) of the configurable impedance networks (410a, 410b) to be capacitive, impedance (520) of the configurable impedance networks (410a, 410b) to be resistive, and impedances (415a, 415b) to be resistive.

While in the exemplary embodiment according to the present disclosure depicted in FIG. 5, the configurable impedance networks (410a, 410b) are shown as two-elements networks comprising configurable impedances (510, 520), and the configurable impedance networks (410c, 410d, 415a, 415b) are shown as a single element networks, it should be noted that other configurations of the configurable networks (410a, 410b, 410c, 410d, 415a, 415b), each comprising one or more configurable impedances, are possible, and the exemplary embodiment depicted in FIG. 5 should not be considered as a limitation of the invention. Such configurations of the configurable networks can be dependent on a system topology of the RF front-end stage and corresponding RF components which can affect the impedance of the complete RF front-end stage. A person skilled in the art will know how to devise a variety of configurable networks, for use as the configurable impedance networks (410a, 410b, 410c, 410d, 415a, 415b), using discrete resistive/reactive elements and configurable via switches, or using tunable elements such as digitally tunable resistors/capacitors/inductors, or a combination of discrete and tunable elements. Digitally tunable capacitors and digitally tunable inductors are described, for example, in International Publication No. WO2009/108391 and U.S. Published Application No. 2013/0222075A1 respectively, both incorporated herein by reference in their entirety. Furthermore, configurable networks are described in, for example, U.S. Published Application No. 2015/0048898A1 and U.S. Published Application No. 2014/0266455A1, both incorporated herein by reference in their entirety.

According to further embodiments of the present disclosure, RF switches comprising one or more stacked transistors (e.g. FETs) can be used as the configurable impedances (510, 520, 410c, 410d, 415a, 415b) of FIG. 5. Knowledge of system topology can allow sizing and biasing of the RF switches to provide a desired equivalent ON resistance and a desired equivalent OFF capacitance for use in the configurable impedance networks (410a, 410b, 410c, 410d, 415a, 415b). As discussed above, FIG. 9 shows an exemplary RF switch which can include one or more stacked FET transistors.

As described in the above sections of the present disclosure, the provision of configurable impedances networks to control the termination of the inactive transmit/receive paths of a front-end stage, as per the various embodiments of the present disclosure, can allow shifting resonance effects, from impedance coupling of inactive transmit/receive paths, within a frequency band of operation of an active transmit/receive path outside the band. Complete knowledge of system topology and associated impedances can allow exact determination of the required termination impedance values to provide an effective shift of the resonance frequency. However, due to system complexity and limitations in correct modeling of the system parameters, in practice this can be a tedious and unrealistic task. Accordingly and per further embodiments of the present disclosure, the configurable impedance networks can be configured to provide more than two impedance values, such as to allow more than one impedance value for termination of a corresponding inactive transmit/receive path. For example and with continued reference to FIG. 5, the configurable impedance (520) of the configurable impedance networks (410a, 410b) can comprise a digitally tunable capacitor which can be tuned, in given step increments, to a value within a range of two values, and the configurable impedance (510) of the configurable impedance networks (410a, 410b) can similarly comprise a variable resistor which can take multiple resistance values within a range of two resistance values. Such tunability of the configurable impedance networks can therefore allow tuning the impedances of the inactive paths coupled to an active path, and therefore providing a frequency range for shifting an undesired resonance. Tuning for optimum values of the configurable impedance networks can be performed during a factory setup phase of a corresponding RF system, or can be performed on the fly and during, for example, a system startup procedure of the RF system.

Figure 6:
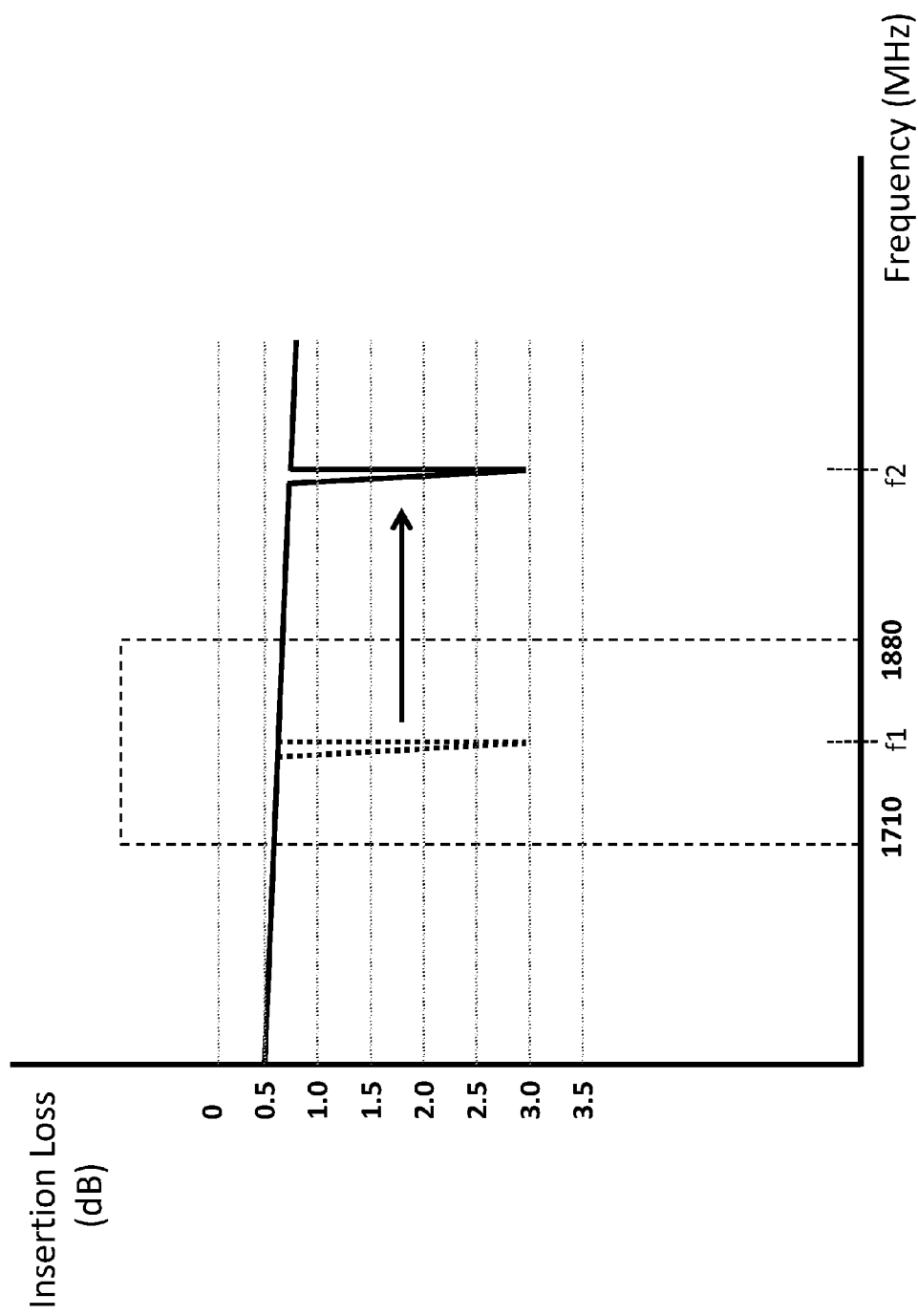
FIG. 6 shows a plot representing a shift of the notch in the insertion loss represented in FIG. 3, caused by the impedance elements shown in FIGS. 4-5.

FIG. 6 shows the effect of the configurable impedance networks (410a, 410b, 410c, 410d, 415a, 415b) on the insertion loss in the active path associated with node TRX4. As can be seen in the insertion loss plot of FIG. 6, the presence of the configurable impedance networks in the inactive paths associated with nodes TRX1, TRX2 and TRX3 can modify the impedance of such paths coupled to node TRX4 via the switch unit (120) and therefore shift a corresponding resonance frequency at node TRX4. This is shown in the plot as a shift of the position of a dip in the insertion loss plot, from one position (frequency f1) within the frequency band of interest (1710-1880 MHz) for a case where no configurable network is provided, as per FIGS. 1-3, to a second position (frequency f2) outside that band, for a case where configurable networks are provided as depicted in FIGS. 4-5.

Figure 7A:
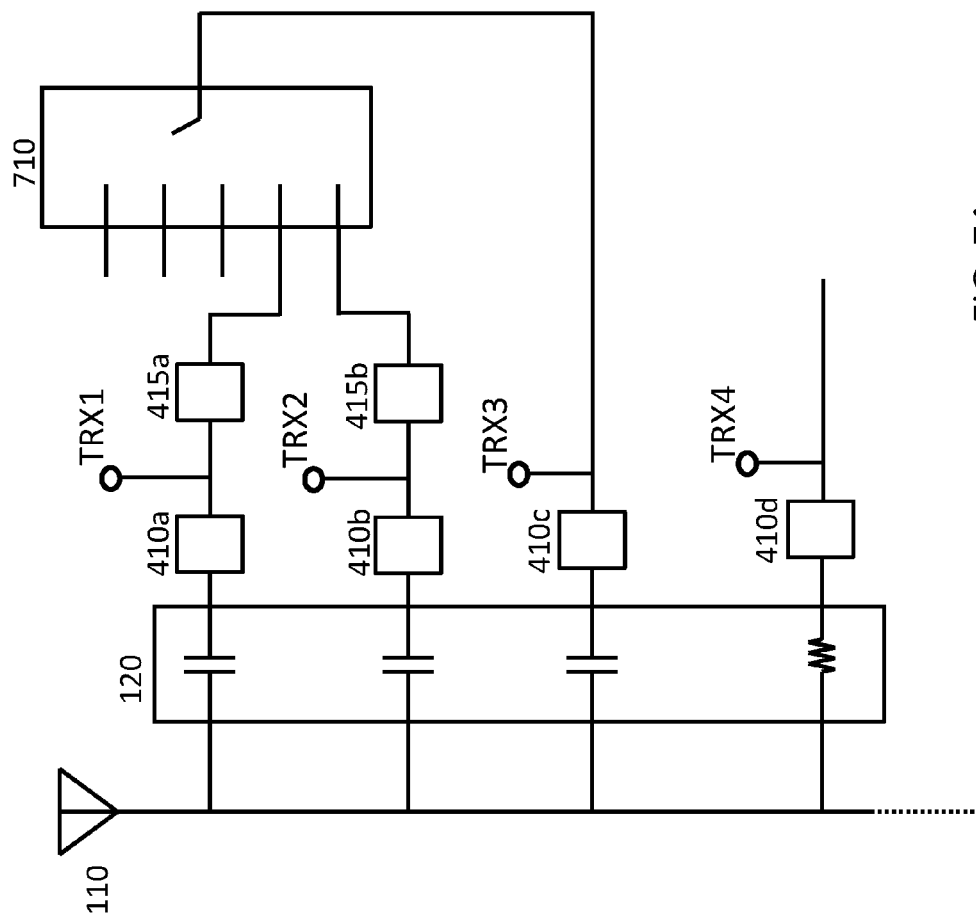
FIG. 7A shows another exemplary embodiment according to the present disclosure where configurable impedance networks are added to the transmit and receive paths of an RF stage such as to overcome the notch in insertion loss depicted in FIG. 3.
Figure 7B:
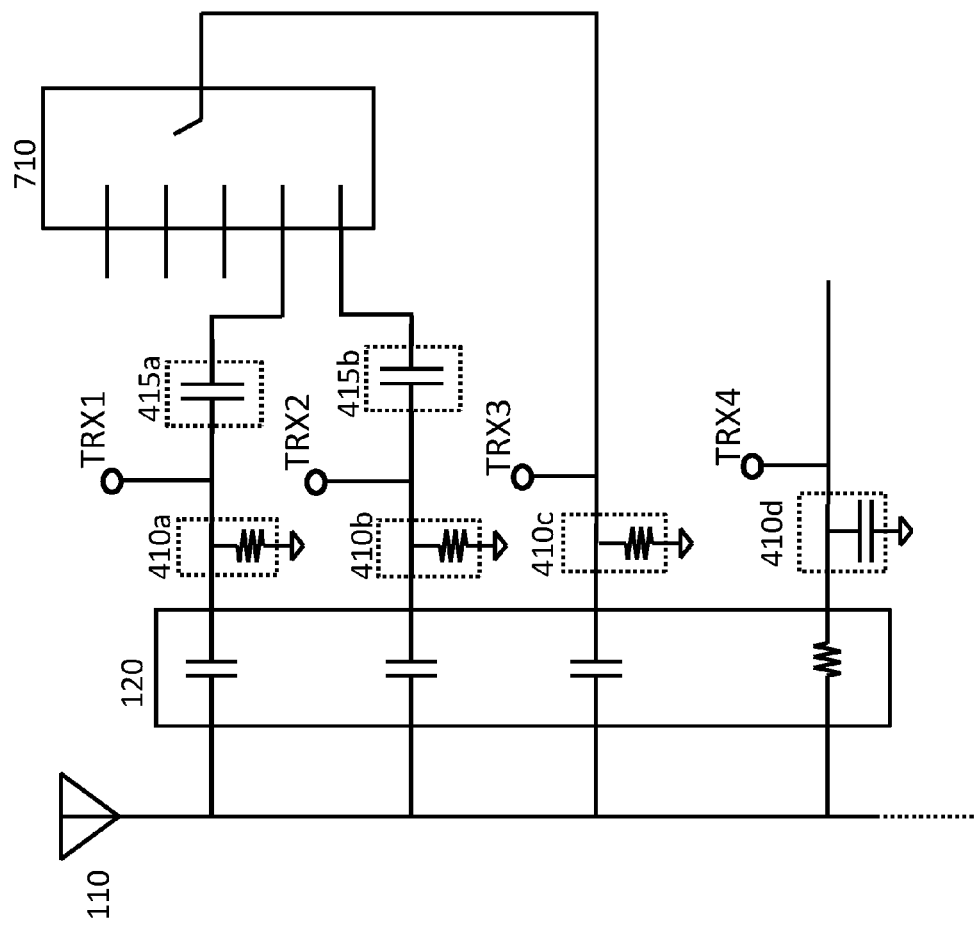
FIG. 7B shows an equivalent block diagram of the RF stage depicted in FIG. 8A, where equivalent internal configurations of a switch unit and the configurable impedance networks are shown.
Figure 7C:
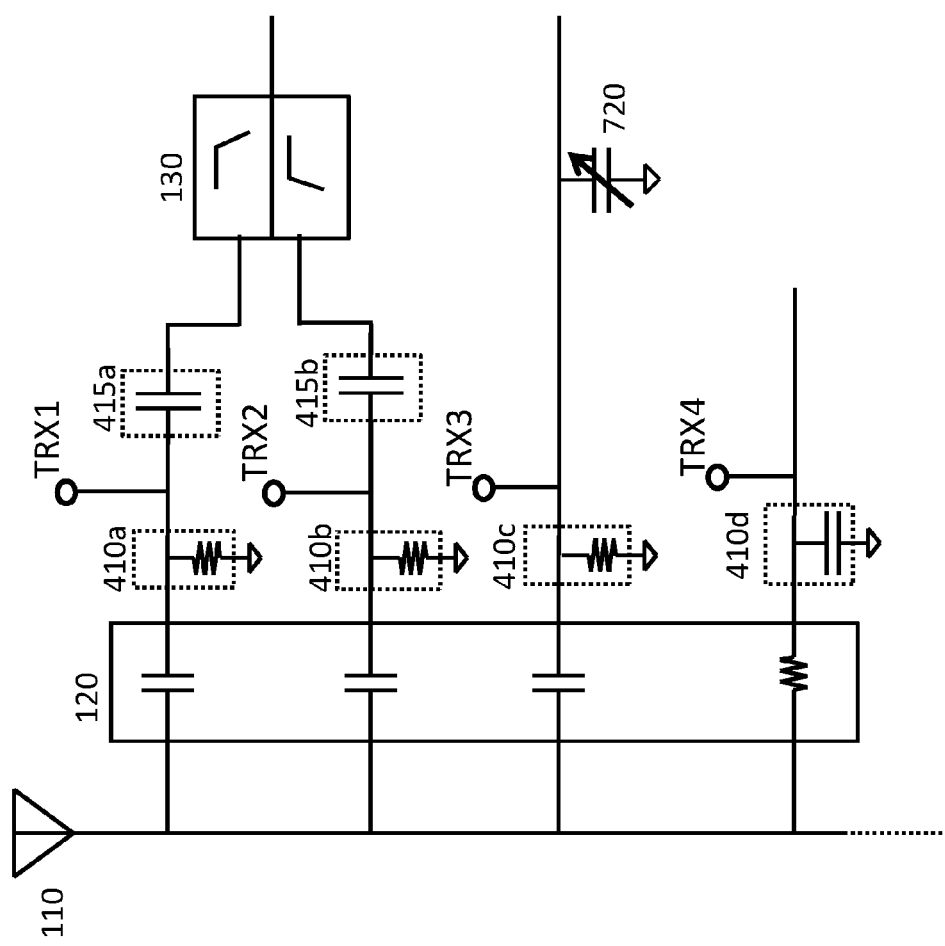
FIG. 7C shows a variant of the block diagram depicted in FIG. 7B where different RF devices are used in corresponding transmit/receive paths.

FIGS. 7A-7C show portion of the RF front-end stage depicted in FIGS. 4-5, where the various transmit/receive paths include different RF components as required by a desired performance of each path. For example, the transmit/receive path associated with node TRX1 of the RF front-end stage (700A) of FIG. 7A can include a switch unit (710) instead of the diplexer (130) of FIGS. 4-5, and can therefore provide a different impedance coupling to node TRX4 of the active transmit/receive path via inactive transmit/receive paths associated with nodes TRX1, TRX2 and TRX3. FIG. 7B shows exemplary impedance configuration of the configurable impedance networks (410a, 410b, 410c, 410d, 415a, 415b) of the RF front-end stage (700A) in the case where transmit/receive path associated with node TRX4 is active, and transmit/receive paths associated with nodes TRX1, TRX2 and TRX3 are inactive. Similarly and as depicted in FIG. 7C, the transmit/receive path associated with node TRX3 can include a tunable capacitor (720), such as for example, a digitally tunable capacitor (DTC) as described in the International Publication No. WO2009/108391, which is incorporated herein by reference in its entirety. The tunable capacitor (720) of FIG. 7C can also affect the impedance coupling provided to node TRX4 of the active transmit/receive path. In the configuration depicted in FIGS. 7A-7C, the configurable impedance networks according to the various embodiments of the present disclosure can equally be used to shift a resonant component coupled via the switch unit (120) to a node of an active transmit/receive path as described in the above sections of the present disclosure.

Figure 8A:
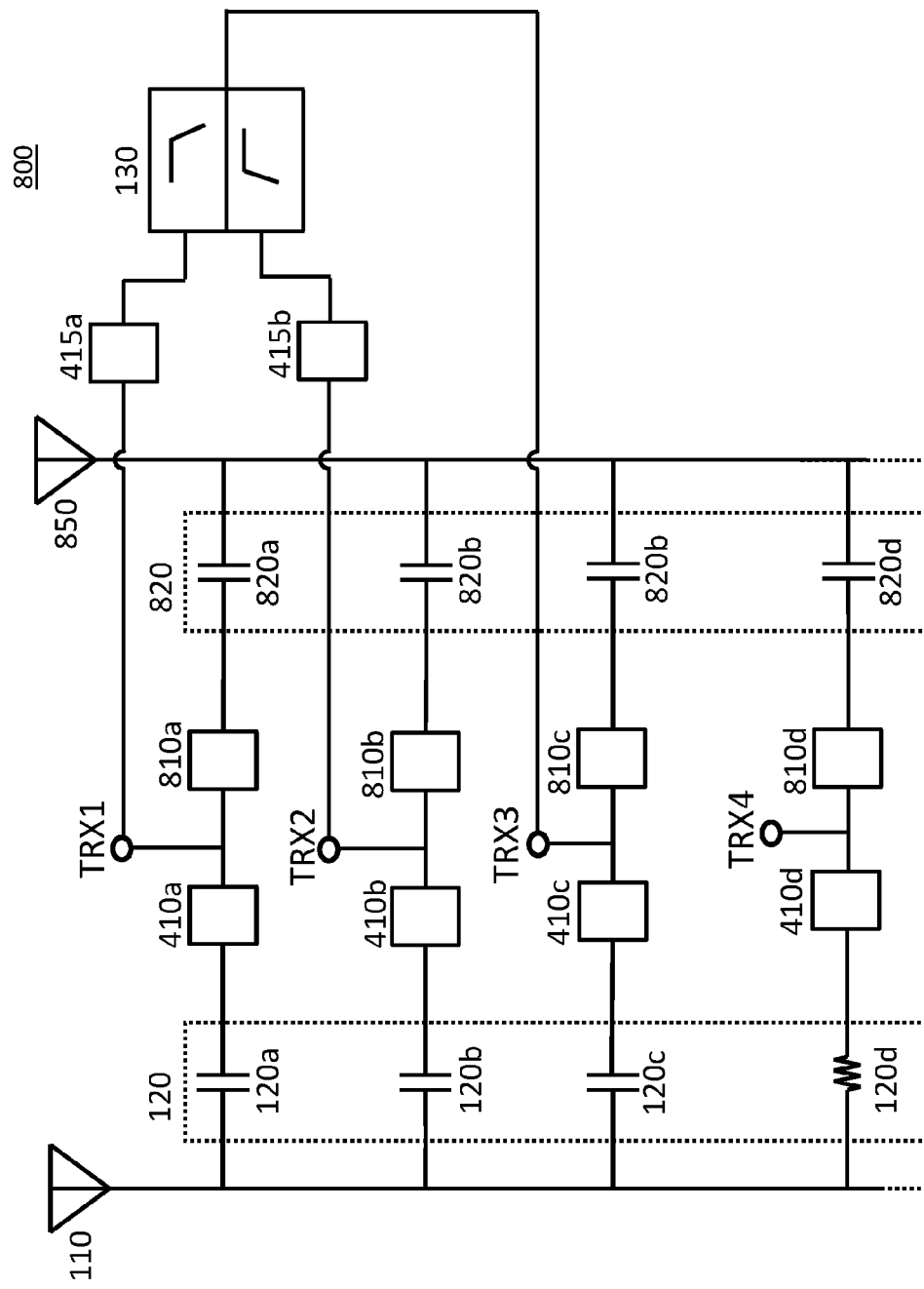
FIG. 8A shows another exemplary embodiment according to the present disclosure where configurable impedance networks are added to the transmit and receive paths of an RF stage coupled to two transmit/receive antennae such as to overcome the dip in insertion loss depicted in FIG. 3.

Although the above discussion with respect to the various embodiments according to the present disclosure use an exemplary RF front-end stage which couples to a single transmit/receive antenna (110), such embodiments according to the present disclosure can equally apply to RF systems which use more than one antenna, such as two or more. The person skilled in the art will know of specific system configurations where more than one antenna is required. FIG. 8A depicts an RF front-end stage (800) according to an embodiment of the present disclosure, similar to the RF front-end stage of FIG. 4A, where instead of coupling to a single antenna (110), each of the transmit/receive paths is coupled to two antennae (110, 850) via an antenna switch (120, 820).

According to the embodiment of the present disclosure depicted in FIG. 8A, each transmit receive path can be provided with a configurable impedance network to terminate the transmit/receive path at a node close to the antenna switch (120, 820). For example, the additional configurable impedance networks (810a, 810b, 810c, 810d) can be used to respectively configure a termination impedance at nodes TRX1, TRX2, TRX3 and TRX4 to affect impedance coupling to alternate nodes/paths via antenna switch (820) and antenna (850), whereas, as described in the above sections of the present disclosure, configurable impedance networks (410a, 410b, 410c, 410d) can be used to respectively configure a termination impedance at nodes TRX1, TRX2, TRX3 and TRX4 to affect impedance coupling to alternate nodes/paths via antenna switch (120) and antenna (110). The combination of configurable impedance networks (410a, 410b, 410c, 410d, 415a, 415b, 810a, 810b, 810c, 810d) can be used to optimize performance of one or more active transmit/receive paths due to a degradation in performance caused by impedance coupling of corresponding inactive paths. Such degradation, as previously mentioned, can be a dip (or more) in the insertion loss due to resonance effects of the impedance coupling to the one or more transmit/receive active paths (e.g. FIGS. 3 and 6) via the combination of elements (110, 120, 820, 850) of the RF front-end stage (800).

With continued reference to FIG. 8A, the depicted configuration according to an embodiment of the present disclosure shows the transmit/receive path associated to node TRX4 actively coupled to the antenna (110) via the antenna switch (120), and not actively coupled (e.g. inactive) to antenna (850) via the antenna switch (820). Other transmit/receive paths associated to nodes TRX1, TRX2 and TRX3 are shown as inactive in FIG. 8A. Therefore, inactive paths impedance couplings to the active path associated to node TRX4 can be provided via either combination of (110, 120) or (820, 850), and a corresponding influence on the performance of the active path can be mitigated via the configurable impedance networks (410a, 410b, 410c, 410d, 415a, 415b, 810a, 810b, 810c, 810d).

Figure 8B:
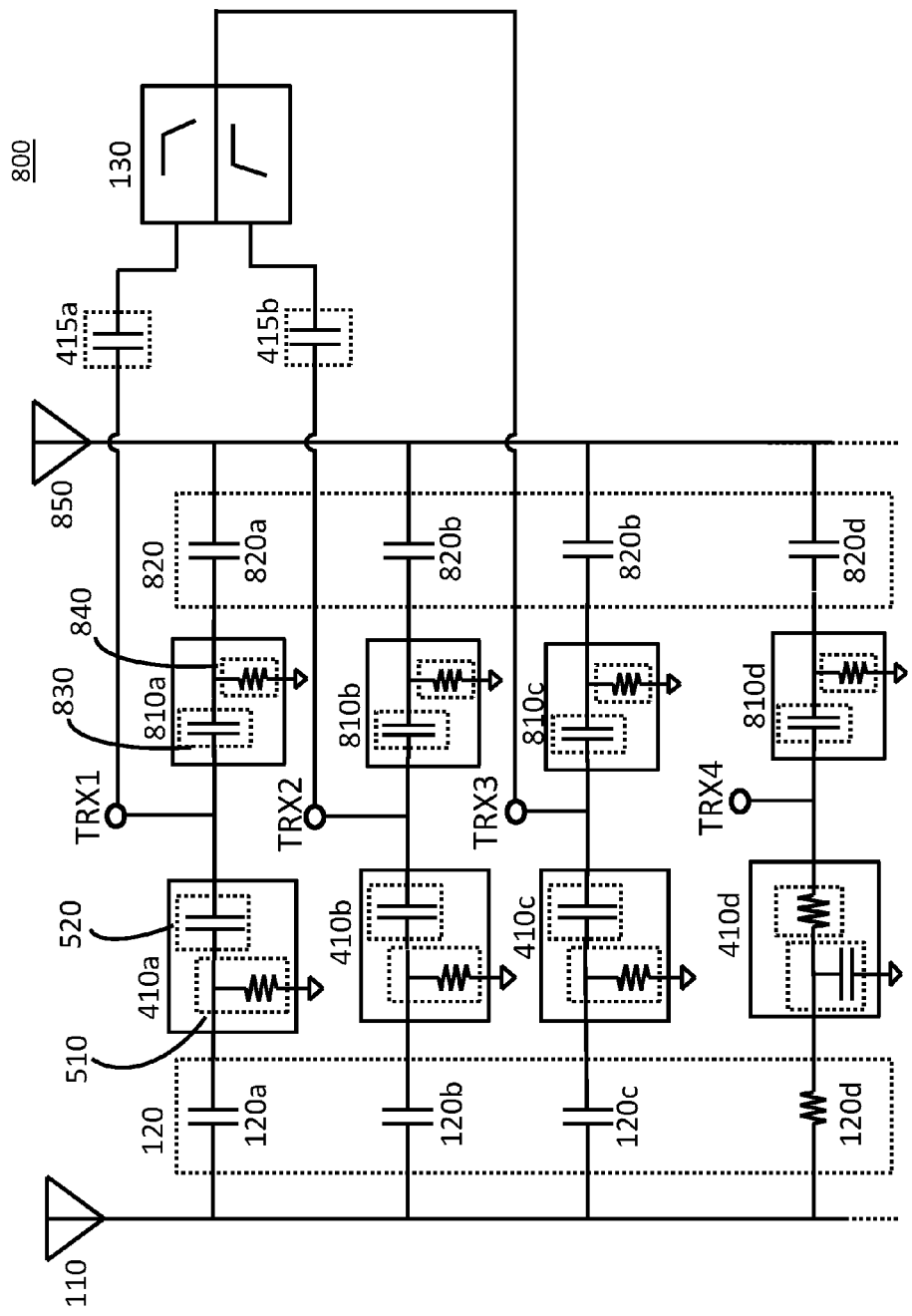
FIG. 8B shows an equivalent block diagram of the RF stage depicted in FIG. 8A, where equivalent internal configurations of the switch units used to couple transmit/receive paths to the antennae and the configurable impedance networks are shown.

FIG. 8B shows an exemplary configuration of the configurable impedance networks according to the various embodiments of the present disclosure provided in the RF front-end stage (800). Such configurable impedance networks can include one, two or more configurable impedances as discussed in the section of the present disclosure with reference to FIG. 5. For example, as depicted in FIG. 8B, configurable impedance networks (810a) can include configurable impedances (830, 840), where each configurable impedance (830, 840) can be configured to be resistive or reactive with one or more varying values.

According to further embodiments of the present disclosure, the combination of the antenna switch (120) and one or more of the configurable impedance networks depicted in FIGS. 4, 5, 7A-7C, and 8A-8B can be monolithically integrated within a same integrated circuit. The person skilled in the art readily understands the benefits of such monolithic integration, which can include, for example, reduced footprint, reduced production cost and product consistency and can be provided by various process technologies known to the skilled person, such as, bulk silicon CMOS, silicon on insulator (SOI) CMOS and silicon on sapphire (SOS) CMOS, as well as other viable semiconductor technology and architecture including micro-electromechanical (MEM) systems.

The person skilled in the art can readily appreciate the degree of complexity provided by the added second antenna (850) of FIG. 8B with respect to the number of impedance coupling paths associated to inactive paths to an active path. According to a further embodiment of the present disclosure, setting of the various values of the configurable impedances can be performed programmatically using feedback from evaluation of an RF signal performance of an active path and then stored in memory for subsequent usage. Alternatively such setting can be performed on the fly during an initialization phase of a corresponding RF device (e.g. handheld cellular).

The examples set forth above are provided to give those of ordinary skill in the art a complete disclosure and description of how to make and use the embodiments of the present disclosure, and are not intended to limit the scope of what the inventors regard as their disclosure. Modifications of the above described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

The invention claimed is:

1. A radio frequency (RF) circuital arrangement comprising:
   a first RF path comprising one or more RF devices;
   a second RF path comprising a configurable impedance network and one or more RF devices;
   an antenna; and
   an antenna switch connected to a first node of the first RF path and to a second node of the second RF path, the antenna switch configured to selectively couple the first node and the second node to the antenna,
   wherein in a first mode of operation of the RF circuital arrangement:
     (i) the antenna switch provides a low impedance resistive coupling between the first node and the antenna,
     (ii) the antenna switch provides a high impedance capacitive coupling between the second node and the antenna, so that an impedance of the second RF path seen at the second node is capacitively coupled to the first node, and
     (iii) the configurable impedance network of the second RF path is configured to affect the impedance seen at the second node so as to shift a resonance frequency of a resonance effect at the first node due to the capacitive coupling of the impedance seen at the second node to the first node.

2. The RF circuital arrangement according to claim 1, wherein the resonance frequency of the resonance effect at the first node due to the capacitive coupling of the impedance seen at the second node to the first node is within a frequency band of the RF signal.

3. The RF circuital arrangement according to claim 2, wherein the configurable impedance network of the second RF path is configured to shift the resonance frequency outside the frequency band of the RF signal.

4. The RF circuital arrangement according to claim 2 or claim 3, wherein the resonance effect affects an insertion loss of the RF signal within the frequency band of the RF signal.

5. The RF circuital arrangement according to claim 4, wherein the resonance effect increases the insertion loss of the RF signal within the frequency band of the RF signal.

6. The RF circuital arrangement according to claim 4, wherein the configurable impedance network of the second RF path is configured to reduce the insertion loss of the RF signal within the frequency band of the RF signal.

7. The RF circuital arrangement according to claim 4, wherein the frequency band is approximately 0.2 GHz wide and the reduction of the insertion loss is equal to or larger than 2 dB in magnitude.

8. The RF circuital arrangement according to claim 1, wherein the configurable impedance network comprises a combination of one or more of: a) an RF switch, b) a resistor, and c) a reactive impedance.

9. The RF circuital arrangement according to claim 8, wherein the RF switch is a stacked transistor switch comprising one or more stacked FET transistors.

10. The RF circuital arrangement according to claim 9, wherein a number of the one or more stacked FET transistors of the stacked transistor switch is based on a desired voltage handling capability of the stacked transistor switch.

11. The RF circuital arrangement according to claim 9, wherein a size of a transistor of the one or more stacked FET transistors is based on a desired current handling capability of the stacked transistor switch.

12. The RF circuital arrangement according to claim 8, wherein the resistor is a variable resistor or a digitally tunable resistor.

13. The RF circuital arrangement according to claim 8, wherein the reactive impedance is a digitally tunable capacitor (DTC) or a digitally tunable inductor (DTL).

14. The RF circuital arrangement according to claim 8, wherein the arrangement is monolithically integrated on a same integrated circuit.

15. The RF circuital arrangement according to claim 1, wherein an RF device of the one or more RF devices comprises one of a) a duplexer, b) a diplexer, c) a switch, d) a low noise amplifier, e) a power amplifier, f) a reactive element, and g) a resistive element.

16. The RF circuital arrangement according to claim 1, wherein the second RF path further comprises one or more additional configurable impedance networks coupled to the one or more RF devices and configured to further affect the impedance seen at the second node.

17. The RF circuital arrangement according to claim 1, wherein the first RF path further comprises a configurable impedance network,
    wherein in a second mode of operation of the RF circuital arrangement:
        the antenna switch provides a low impedance resistive coupling between the second node and the antenna,
        the antenna switch provides a high impedance capacitive coupling between the first node and the antenna, so that an impedance of the first RF path seen at the first node is capacitively coupled to the second node, and
        the configurable impedance network of the first RF path is configured to affect the impedance seen at the first node so as to shift a resonance frequency of a resonance effect at the second node due to the capacitive coupling of the impedance seen at the first node to the second node.

18. The RF circuital arrangement according to claim 17, wherein in the first mode of operation:
    the configurable impedance network of the first RF path provides a capacitive coupling between the first node and a reference ground, and
    the configurable impedance network of the second RF path provides a resistive coupling between the second node and the reference ground.

19. The RF circuital arrangement according to claim 18, wherein in the second mode of operation:
    the configurable impedance network of the first RF path provides a resistive coupling between the first node and a reference ground, and
    the configurable impedance network of the second RF path provides a capacitive coupling between the second node and the reference ground.

20. The RF circuital arrangement according to claim 1, further comprising a third RF path comprising a configurable impedance network, wherein:
    the antenna switch is further connected to a third node of the third RF path,
    the antenna switch is further configured to selectively couple the third node to the antenna, and
    the first mode of operation of the RF circuital arrangement further comprises:
        the antenna switch provides a high impedance capacitive coupling between the third node and the antenna, so that an impedance of the third RF path seen at the third node is capacitively coupled to the first node; and
        the configurable impedance network of the third RF path is configured to further affect the impedance seen at the third node so as to further affect the resonance frequency of the resonance affect at the first node due to the further capacitive coupling of the impedance seen at the third node to the first node.

21. The RF circuital arrangement according to claim 20, wherein in the first mode of operation:
    the configurable impedance network of the second RF path provides a resistive coupling between the second node and the reference ground, and
    the configurable impedance network of the third RF path provides a resistive coupling between the third node and the reference ground.

* * * * *